Nov. 15, 1932.  B. G. GOBLE  1,887,551

CLAMP FOR ANGLES AND THE LIKE

Filed April 1, 1929

Inventor
BERT G. GOBLE.
By Tom B. Boman,
Attorney

Patented Nov. 15, 1932

1,887,551

UNITED STATES PATENT OFFICE

BERT G. GOBLE, OF TULSA, OKLAHOMA, ASSIGNOR TO W. A. QUIGLEY

CLAMP FOR ANGLES AND THE LIKE

Application filed April 1, 1929. Serial No. 351,659.

This invention relates to an improved clamp for angles and the like and more particularly to a clamp which will adjustably connect two or three angles without any mutilation whatsoever of the angles.

Most of the devices on the market at the present day for attaching two angles in rigid relationship are objectionable because the angles themselves must be mutilated in order that the device may be fastened thereto. Furthermore, such devices do not have unlimited longitudinal adjustment within limits.

Now, in my improved device or article of manufacture, I overcome both of these recited objections. Furthermore, I obtain several additional advantages which will be set forth as the specification proceeds.

My preferred clamp is of closed contour and has an L-shaped opening therethrough and the two angles are slid through this opening. An ordinary bolt extends through a small hole in the clamp and abuts against the angles. A nut on the bolt on the inside of the L-shaped opening causes the bolt to advance firmly and tightly against the two angles thus holding them locked in position. One edge of the nut slidingly engages a shoulder on the body and the reaction therefrom causes the bolt to push tightly against one side of its hole and in so moving it forces the angles against the inner corner of the body. Thus, due to the happy location of the shoulder, I obtain a double gripping effect on the angles.

From the above brief description it will be seen that no cutting or boring operations need to be performed on the angles in order to attach them together by means of my improved clip. Hence, the angles may be used as often as desired and yet maintain a high salvage value.

Furthermore, since my holding bolt will operate equally well on any section of the angles it is apparent that I may obtain any adjustment within limits. That is, the angles may be slid relative to each other to exactly the desired position and then clamped in that position by simply tightening the single bolt.

Another advantage of my clamp is that it may readily be manufactured by stamping, forging or casting. Any suitable material may be used. Also, as it consists of only one principal part, which requires no machine work of any kind, it is very cheap to manufacture.

As will be appreciated from the drawing a single clamp will fit a number of different size angles. Also, it is easy to apply initially and easy to adjust.

The subject matter of this application as shown in Figs. 5 and 6 is taken from a former application filed by applicant on Aug. 31, 1928. The title of this preceding application is shackle line equalizer and its serial number is 303,307.

The further objects and advantages will be obvious to one skilled in the art without further description.

Similar numerals refer to similar parts throughout the several views.

Figure 1:
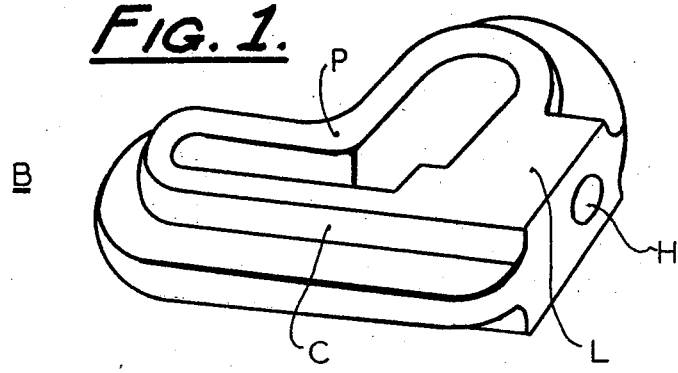
Fig. 1 is a perspective view of my preferred form of clamp.
Figure 2:
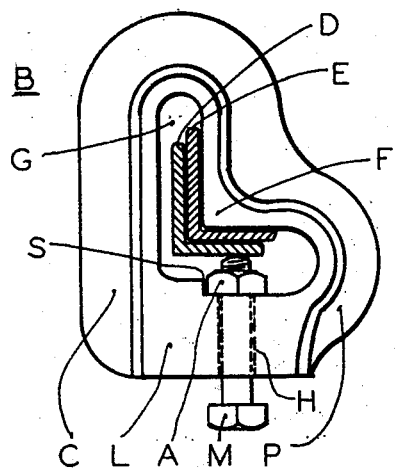
Fig. 2 is a top or plan view of my clamp applied to two angles.
Figure 3:
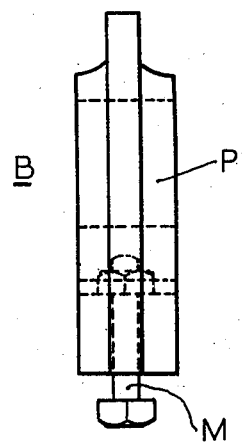
Fig. 3 is a side view of my clamp.
Figure 4:
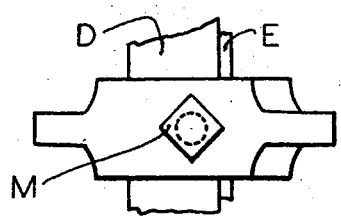
Fig. 4 is an end view of my clamp.

Referring particularly to Fig. 2, the main body, B, is composed of three parts, a side member or arm, C, another somewhat shorter side member, L, perpendicular to the preceding side member, and an angle portion, P. The portion, P, connects the spaced ends of the side members in hypotenuse fashion as clearly shown in the drawing.

Either of the side members, L, as shown, has a hole, H, formed therethrough. A bolt, M, freely fits this hole and a nut, A, is threaded on the bolt. The side member, L, has a shoulder, S, which prevents the nut from turning. This shoulder also has a camming effect upon the nut riding against it and pushes the end of the bolt away from it as the bolt travels inwardly. This results in proper seating of the angles.

Angles D and E, either the same or different sizes, are slidably placed in the L-shaped opening, G, the angle, E, resting against the corner, F, formed on the angle portion, P.

Hence, when the bolt, M, is turned in a clockwise direction, the nut, being held from rotation by the shoulder, S, will advance it to engage the back of the outermost angle, D. The end of the bolt, M, tightly resting against the outer angle pushes it into snug engagement with the inner angle thus preventing any relative movement therebetween. In other words, both surfaces of the angles interlock with adjacent surfaces due to irregularities in their surfaces and hence shearing stresses are set up between the angles themselves thus materially diminishing the strain on the bolt, M.

Figures 5, 6:
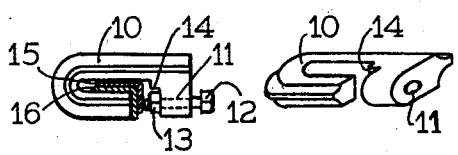
Fig. 5 is a plan view of a modification of my device.
Fig. 6 is a perspective view of the modification shown in Fig. 5.

Figs. 5 and 6 disclose a modification of my device. Herein, 10 designates a G-shaped body portion which has a hole, 11, formed therein. A bolt, 12, passes through this hole, 11, and is provided with a nut, 13, which abuts the shoulder, 14. This shoulder prevents the nut from turning as the bolt is forced home against the angles, 15 and 16. Also, this shoulder causes the point of the bolt to be shoved sideways as it is forced home against the angles and thus causes tight gripping of same.

While I have described a complete embodiment of my invention I do not wish to be limited to the particular construction shown, my invention being in fact limited solely by the attached claims.

1. A clamp consisting of a body member having a closed L-shaped opening therethrough; said body member also having a hole therethrough extending into said opening near one end thereof, a single shoulder adjacent the hole, a bolt adapted to loosely pass through the hole and nut means adapted to be threaded onto the bolt and have one of its edges in contact with said shoulder.

2. In a clamp comprising a body member having a hole therethrough adapted to receive a bolt with a nut thereon; said bolt being of such diameter as to be loosely received in said hole the combination of a shoulder on the body member adapted to cam against one face of the nut whereby rotation of the bolt will cause it to move both lengthwise and sidewise.

In testimony whereof I affix my signature.

BERT G. GOBLE.